(12) United States Patent
Hasegawa et al.

(10) Patent No.: US 6,563,234 B2
(45) Date of Patent: May 13, 2003

(54) POWER SYSTEM STABILIZATION SYSTEM AND METHOD EMPLOYING A RECHARGEABLE BATTERY SYSTEM

(75) Inventors: Yoshihiro Hasegawa, Osaka (JP); Masatoshi Okubo, Osaka (JP); Tetsuo Sasaki, Osaka (JP)

(73) Assignees: Sumitomo Electric Industries, Ltd., Osaka (JP); Kansai Electric Power Co., Inc., Osaka (JP)

( * ) Notice: Subject to any disclaimer, the term of this patent is extended or adjusted under 35 U.S.C. 154(b) by 99 days.

(21) Appl. No.: 09/774,683

(22) Filed: Feb. 1, 2001

(65) Prior Publication Data

US 2001/0012211 A1 Aug. 9, 2001

(30) Foreign Application Priority Data

Feb. 3, 2000 (JP) ..................... 2000-026458
Jul. 13, 2000 (JP) ..................... 2000-212517

(51) Int. Cl.[7] .................................... H02J 7/00
(52) U.S. Cl. ............................ 307/66; 307/46
(58) Field of Search .................. 307/66, 46, 87; 323/207; 363/35; 318/376

(56) References Cited

U.S. PATENT DOCUMENTS 4,677,309 A * 6/1987 Ogawa ..................... 307/66
4,703,193 A * 10/1987 Kawabata ................. 307/66
5,473,528 A * 12/1995 Hirata et al. ............... 363/71

FOREIGN PATENT DOCUMENTS

| DE | 3311299 A1 | 10/1984 |
|---|---|---|
| JP | 58-204737 | 11/1983 |
| JP | 59-181925 | 10/1984 |
| JP | 1-238430 | 9/1989 |
| JP | 4-178807 | 6/1992 |
| JP | 4-359631 | 12/1992 |
| JP | 6-205547 | 7/1994 |
| JP | 7-177748 | 7/1995 |
| JP | 11-262187 | 9/1999 |
| JP | 2000-9021 | 1/2000 |
| JP | 2000-217257 | 8/2000 |

* cited by examiner

Primary Examiner—Shawn Riley
(74) Attorney, Agent, or Firm—McDermott, Will & Emery

(57) ABSTRACT

A power system stabilization system is provided between power generation equipment significantly fluctuating in output and a power system required to maintain a predetermined voltage. In the power system stabilization system, a voltage detection device and a current detection device detect voltage and current, respectively, of the power system and voltage and current thus detected are used to calculate a level of active power required and that of reactive power required which are referred to to provide charging and discharging from a rechargeable battery to the power system via an A-D converter.

12 Claims, 7 Drawing Sheets

FIG. 6

CAPACITY OF RECHARGEABLE BATTERY FOR PREVENTION OF INSTANTANEOUS VOLTAGE DROP (OVERLOADED 4 TIMES)

| FAULT LINE | INSTALLATION LOCATION | VOLTAGE DIP | REQUIRED CAPACITY OF RECHARGEABLE BATTERY (MVA) | | | | | | | | |
|---|---|---|---|---|---|---|---|---|---|---|---|
| | | | 0.1 | 0.5 | 1 | 5 | 10 | 50 | 100 | 500 | 1000 |
| 500 kV AC LINE (THREE-PHASE FAULT) | CUSTOMER FOR LOW VOLTAGE | 31% | O | O | O | O | O | O | O | O | O |
| | CUSTOMER FOR MEDIUM VOLTAGE | 31% | X | O | O | O | O | O | O | O | O |
| | CUSTOMER FOR HIGH VOLTAGE | 31% | X | X | X | X | O | O | O | O | O |
| | SUBSTATION FOR MEDIUM VOLTAGE | 31% | X | X | X | X | O | O | O | O | O |
| 275 kV AC LINE (LINE-TO-GROUND FAULT) | CUSTOMER FOR LOW VOLTAGE | 44% | X | O | O | O | O | O | O | O | O |
| | CUSTOMER FOR MEDIUM VOLTAGE | 44% | X | X | X | X | O | O | O | O | O |
| | CUSTOMER FOR HIGH VOLTAGE | 44% | X | X | X | X | X | O | O | O | O |
| | SUBSTATION FOR MEDIUM VOLTAGE | 44% | X | X | X | X | O | O | O | O | O |
| 500 kV AC LINE (THREE-PHASE FAULT) | CUSTOMER FOR LOW VOLTAGE | 82% | X | X | O | O | O | O | O | O | O |
| | CUSTOMER FOR MEDIUM VOLTAGE | 82% | X | X | X | X | X | O | O | O | O |
| | CUSTOMER FOR HIGH VOLTAGE | 82% | X | X | X | X | X | X | X | O | O |
| | SUBSTATION FOR MEDIUM VOLTAGE | 82% | X | X | X | X | X | O | O | O | O |
| 275 kV AC LINE (THREE-PHASE FAULT) | CUSTOMER FOR LOW VOLTAGE | 100% | X | X | O | O | O | O | O | O | O |
| | CUSTOMER FOR MEDIUM VOLTAGE | 100% | X | X | X | X | X | O | O | O | O |
| | CUSTOMER FOR HIGH VOLTAGE | 100% | X | X | X | X | X | X | X | O | O |
| | SUBSTATION FOR MEDIUM VOLTAGE | 100% | X | X | X | X | X | O | O | O | O |

POWER SYSTEM STABILIZATION SYSTEM AND METHOD EMPLOYING A RECHARGEABLE BATTERY SYSTEM

BACKGROUND OF THE INVENTION

1. Field of the Invention

The present invention relates to power system stabilization systems and methods employing a rechargeable battery system.

2. Description of the Background Art

In the present invention, "power system stabilization" refers to reducing disturbance of frequency, voltage, active power, reactive power and phase angle that occurs in first equipment generating power, second equipment consuming power and a power system connecting the first equipment and the second equipment together. In a vicinity of an electric furnace load, an electric railways load and other similar, fluctuating loads, voltage and frequency near these loads fluctuate frequently and widely. To prevent this, the devices like a static var compensator and a static var generator are used in order to reduce voltage fluctuations by compensating reactive power.

In case of solar and wind power whose output power fluctuate according to weather condition, the voltage in vicinity of the generator fluctuates frequently and widely, a static var compensator and a static var generator are used in order to reduce voltage fluctuations by compensating reactive power. To prevent an instantaneous voltage drop, a customer uses a small-capacity, uninterruptible power supply and the like. Furthermore, to maintain stability of a system in phase angle, frequency and voltage, in a power system an operational limit is determined for a power transmission line to secure reliable operation. If an accident occurs exceeding the operating limit, the power generator is disconnected.

Conventionally, energy attributed to regenerative-breaking in electric railways is consumed in the form of thermal energy through resistance. Furthermore, when an electric furnace, a rolling machine and the like cause a load fluctuation, a voltage flicker occurs. As a result, lighting appliance, color TVs and the like cause flicker which degrades power quality.

Furthermore, solar power generation and wind power generation provide an output fluctuating with whether conditions. This is a cause of voltage fluctuations and frequency variations in a power system. Conventionally, a single system is used to compensate only for reactive power to overcome such fluctuations. This method, however, only functions to compensate for voltage fluctuations.

Furthermore, instantaneous voltage drop significantly affects computers and other similar electronic equipment. As such, today, with computers and the like widely used, instantaneous voltage drop damages electronic equipment and causes data loss. As such, in the current state a small-capacity, uninterruptible power supply or the like needs to be installed to prevent such disadvantages.

Furthermore, to maintain the stability of a power system, power flow of a power transmission line is limited to be lower in value than a thermal capacity limit in operating the system. In this method, however, the ability of the power transmission line is not fully utilized. As such, efficient operation cannot be achieved.

When you look at a customer's equipment, regenerative energy in electric railways is discharged into the atmosphere in the form of thermal energy. As such, additional equipment is required. This requires an additional cost for maintaining and operating the equipment and also goes against energy-saving.

SUMMARY OF THE INVENTION

The present invention therefore contemplates a power system stabilization system and method employing a rechargeable battery system capable for example of preventing a customer from significantly fluctuating in load and preventing power generation equipment from providing an output significantly fluctuating with weather conditions, to reliably supply power.

The present invention provides a power system stabilization system employing a rechargeable battery system provided between first equipment generating power and second equipment consuming power. The power system stabilization system includes: a detection circuit detecting a difference between the current state and an active power and a reactive power that should be held by a power system connecting the first equipment and the second equipment together; and a control circuit referring to a result of detection obtained by the detection circuit, to control an active power and a reactive power that are output from the rechargeable battery system.

In the present invention, there is detected in a power system a difference between a predetermined active power and reactive power to be held by the power system and the current state thereof and the resultant difference is referred to to control an active power and a reactive power that are generated from a rechargeable battery system. The rechargeable battery system, rapidly responding to a control command value issued from a power system, can be used to control the power system's active power and reactive power to have a predetermined value. As such, if a customer significantly fluctuates in load or solar power generation, wind power generation and any other similar power generation equipment provides an output that significantly fluctuates with weather conditions, such fluctuations do not have any significant effect on the power system. Thus, the power system stabilization system can reliably supply power.

Furthermore, active power and reactive power can both be used to compensate for a deviation relative to a reference value serving as a control target, to efficiently prevent voltage fluctuation, instantaneous voltage drop, and oscillation of a power generator. Furthermore, for an area with a load exceeding a surge impedance loading (SIL), voltage can be effectively controlled with active power and it can thus also be controlled for an area that cannot be controlled simply with reactive power. The rechargeable battery system can also be used for load leveling and in the form of a single device can have multiple functions and it can thus also be economically advantageous.

More preferably, the detection circuit includes a first detection circuit detecting an actual reactive power of the power system and a second detection part detecting an actual active power of the power system. The power system can have its actual active power and reactive power detected and referred to to control an active power and a reactive power that are generated from the rechargeable battery system. As such, power can be supplied in stable manner in a vicinity of equipment and customers in effect fluctuating in active power and reactive power, such as solar and wind power generation equipment providing an output significantly fluctuating with weather conditions, customers significantly fluctuating in load, such as electric railways and electric furnaces, and the like.

Still preferably, the detection circuit further includes: a voltage deviation detection circuit detecting a difference between a predetermined voltage to be held by the power system and an actual voltage of the power system; and a frequency deviation detection circuit detecting a difference between a predetermined frequency to be held by the power system and an actual frequency of the power system.

A difference between a predetermined voltage to be held by a power system and an actual voltage thereof and a difference between a predetermined frequency to be held by the power system and an actual frequency thereof, can be detected and referred to to control an active power and a reactive power that are generated from the rechargeable battery system. As such, power can also be supplied in stable manner to a location which, while free of significant variations in active power and reactive power, is close to a relatively unstable power supply, a customer significantly fluctuating in load or the like and it is thus influenced by voltage fluctuation and frequency variation.

Still preferably, the control circuit refers to duration characteristic of overload outputs of the rechargeable battery system to control of an output the rechargeable battery system to make the most use of the ability of the rechargeable battery.

Still preferably, the control circuit refers to a rechargeable battery efficiency characteristic according to a charging and discharging cycle period to control an power output of the rechargeable battery system to make the most use of the ability of the rechargeable battery.

Still preferably, the rechargeable battery system can generate active power and reactive power to effectively prevent an instantaneous voltage drop.

Furthermore, as seen from a customer employing it, a power system stabilization system uses a rechargeable battery system provided between a power system and electric railways equipment to absorb regenerative energy attributed to a regenerative-breaking of a vehicle of the electric railways equipment.

Furthermore, since the rechargeable battery system can absorb reactive energy attributed to reactive-breaking of a vehicle of electric railways equipment, not only can the rechargeable battery system prevent voltage variation but also absorb power generated through regenerative-breaking of voltage and again discharge the power to effectively use energy.

The present invention in still another aspect provides a method of stabilizing a power system via a rechargeable battery system provided between power generation equipment and load, including the steps of: detecting a deviation of each of a power generation frequency, a voltage, an active power and a reactive power of the power generation equipment and a linkage-point phase angle of the power generation equipment; and referring to the deviation to control an active power and a reactive power of the rechargeable battery system to supply the load with a predetermined level of power.

As such, power generation equipment's power generation frequency, voltage, active power and reactive power deviations and phase angle can be detected and each detected deviation can be referred to to control the rechargeable battery system's active power and reactive power to supply load with a predetermined level of power so as to prevent a customer from significantly fluctuating in load. As such, if solar power generation equipment, wind power generation equipment and the like fluctuate in output with weather conditions, the power system stabilization method employing the rechargeable battery system can prevent such fluctuation in power generation to reliably supply power.

BRIEF DESCRIPTION OF THE DRAWINGS

In the drawings:

FIG. 6 is a table showing a calculation of a capacity of a rechargeable battery installed in a power system shown in FIG. 5 that is effective in reducing an instantaneous voltage drop.

DESCRIPTION OF THE PREFERRED EMBODIMENTS

Hereinafter an embodiment of the present invention will be described with reference to the drawings.

Figure 1:
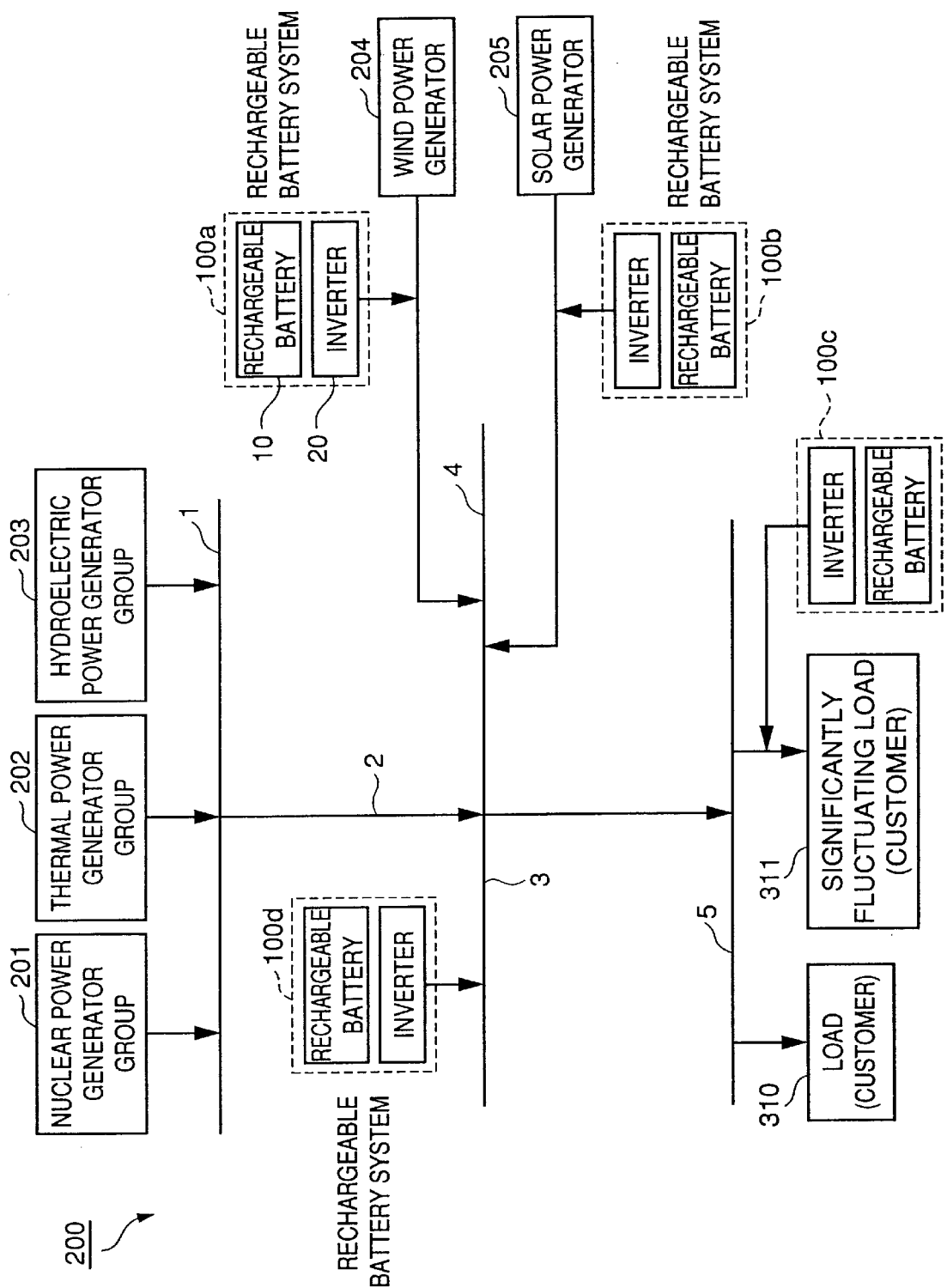
FIG. 1 is a schematic view showing a specific application of a power system stabilization system in accordance with the present invention.

FIG. 1 shows by way of example a power system with a battery system of the present invention applied thereto. As shown in the figure, the power system includes typical power generation equipment 200 including a group of nuclear power generators 201, a group of thermal power generators 202, a group of hydroelectric generators 203 and the like.

Power generation equipment also includes a wind power generator 204, a solar power generator 205 and other generation equipment significantly fluctuating in power generation. A rechargeable battery system 100*a*, 100*b* in accordance with the present invention is incorporated between such power generation equipment significantly fluctuating in power generation and a typical power system 4. Rechargeable battery system 100*a*, 100*b* includes a rechargeable battery 10 and an inverter 20 referring to a detected level in current and voltage of the power system to control power generation of the rechargeable battery.

A load, consuming power, includes a general customer 310, a customer 311 significantly fluctuating in load, such as electric railway and electric furnaces, and the like. A rechargeable battery system 100*c* of the present invention can also be applied between customer 311 significantly fluctuating in load and a typical power system 5.

Quick-response, rechargeable battery system 100*c* can be used to simultaneously control active power and reactive power for the rechargeable battery system to correspond to load fluctuation and voltage fluctuation for example of an electric furnace, electric railway or any other similar customer significantly fluctuating in load, to prevent the load fluctuation and voltage fluctuation of the customer. Furthermore, the customer can also collect regenerative energy from electric railway.

A rechargeable battery system is also provided for a subsystem 3 branched from main system 1 and 2; a customer distant from wind power generator 204 and solar power generator 205, significantly fluctuating in output, customer 311 significantly fluctuating in load and the like also has voltage fluctuation and frequency variation. Even if it does not have an active power or a reactive power significantly fluctuating from a predetermined value, it can experience voltage fluctuation, frequency variation and the like attributed to an accident of the power system. Such fluctuation can be absorbed by a power system stabilization system employing a rechargeable battery system 100d.

Note that rechargeable battery system 100d is identical in configuration for example to rechargeable battery system 100a.

Figure 2:
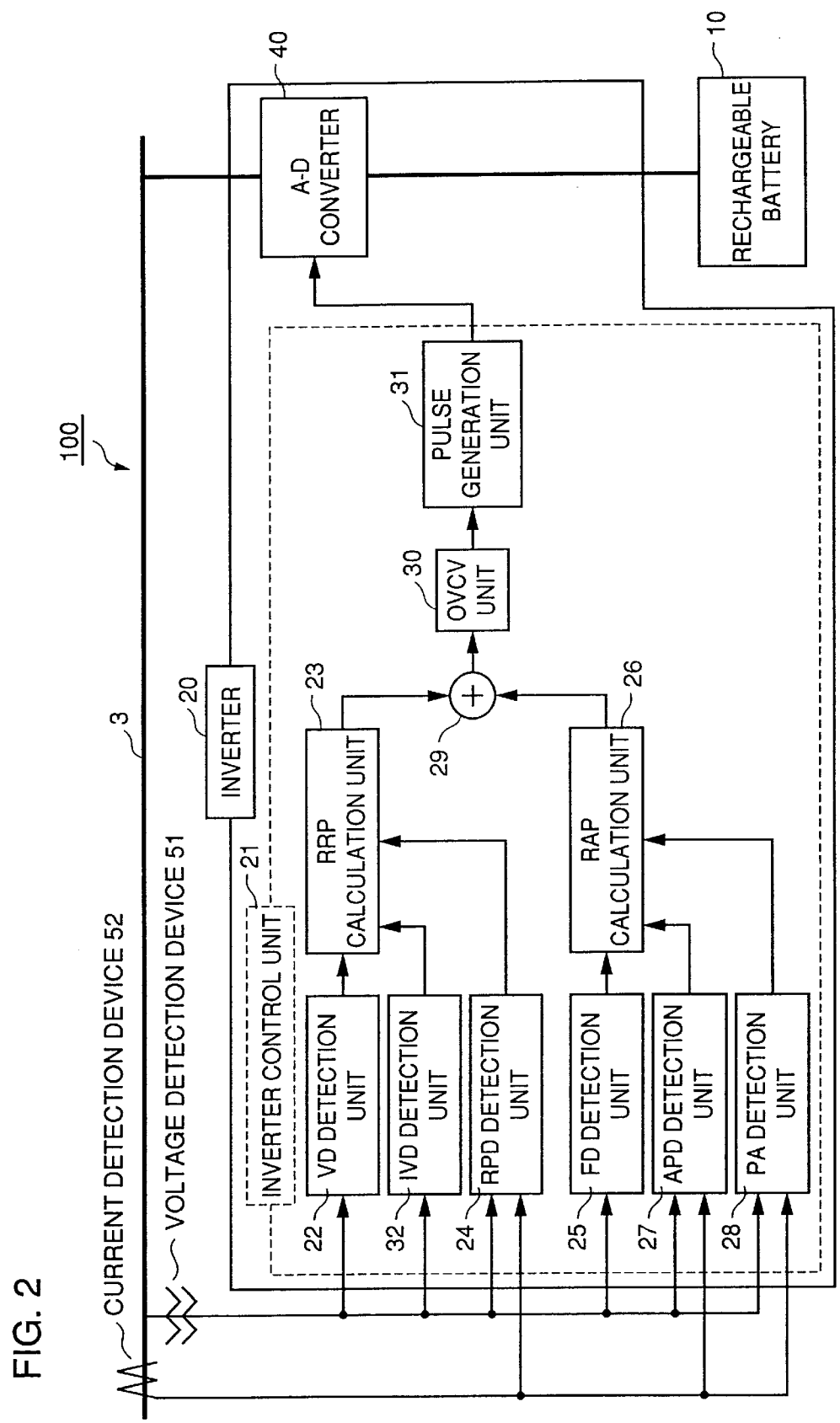
FIG. 2 is a block diagram showing a main portion of a power system stabilization system in the present invention.

FIG. 2 is a block diagram specifically showing a configuration of rechargeable battery system 100. As a component of rechargeable battery system 100, inverter 20 includes an A-D converter 40 connected to rechargeable battery 10. A voltage detection device 51 and a current detection device 52 are used to measure voltage and current of the power system of interest which are referred to to charge and discharge for the power system via A-D converter 40.

Inverter control unit 21 includes a voltage deviation (VD) detection unit 22 detecting a measured system voltage obtained by voltage detection device 51, an instantaneous voltage drop (IVD) detection unit 32 receiving a system voltage from voltage detection device 51 to detect an instantaneous voltage drop, a reactive power deviation (RPD) detection unit 24 receiving voltage detected by voltage detection device 51 and current detected by current detection device 52, and required reactive power (RRP) calculation unit 23 calculating a required reactive power depending on a result of detection obtained by VD detection unit 22, RPD detection unit 24 and IVD detection unit 32.

Inverter control unit 21 also includes a frequency deviation (FD) detection unit 25 receiving a frequency deviation of any of systems 1 to 5 detected by voltage detection device 51, an active power deviation (APD) detection unit 27 detecting an active power deviation from voltage detected by voltage detection device 51 and current detected by current detection device 52, a phase angle (PA), detection unit 28 detecting a phase angle from voltage detected by voltage detection device 51, current detected by current detection device 52 and reference active power, and a required active power (RAP) calculation unit 26 receiving outputs from FD detection unit 25, APD detection unit 27 and PA detection unit 28.

Thus, VD detection unit 22 and RPD detection unit 24 are provided to calculate a required reactive power, and FD detection unit 25, APD detection unit 27 and PA detection unit 28 are provided to calculate a required active power. Herein, VD detection unit 22 and RPD detection unit 24 detect different subjects and they can compliment each other to stabilize system power in detail, which will be described hereinafter.

FD detection unit 25, APD detection unit 27 and PA detection unit 28 also detect similar subjects, which is also the same as above.

An output of RRP calculation unit 23 and that of RAP calculation unit 26 are added together by an adder 29. The values added together are output to an output voltage command value (OVCV) unit 30 which provides an output input to a pulse generation unit 31. According to the value A-D converter 40 operates.

Figure 3:
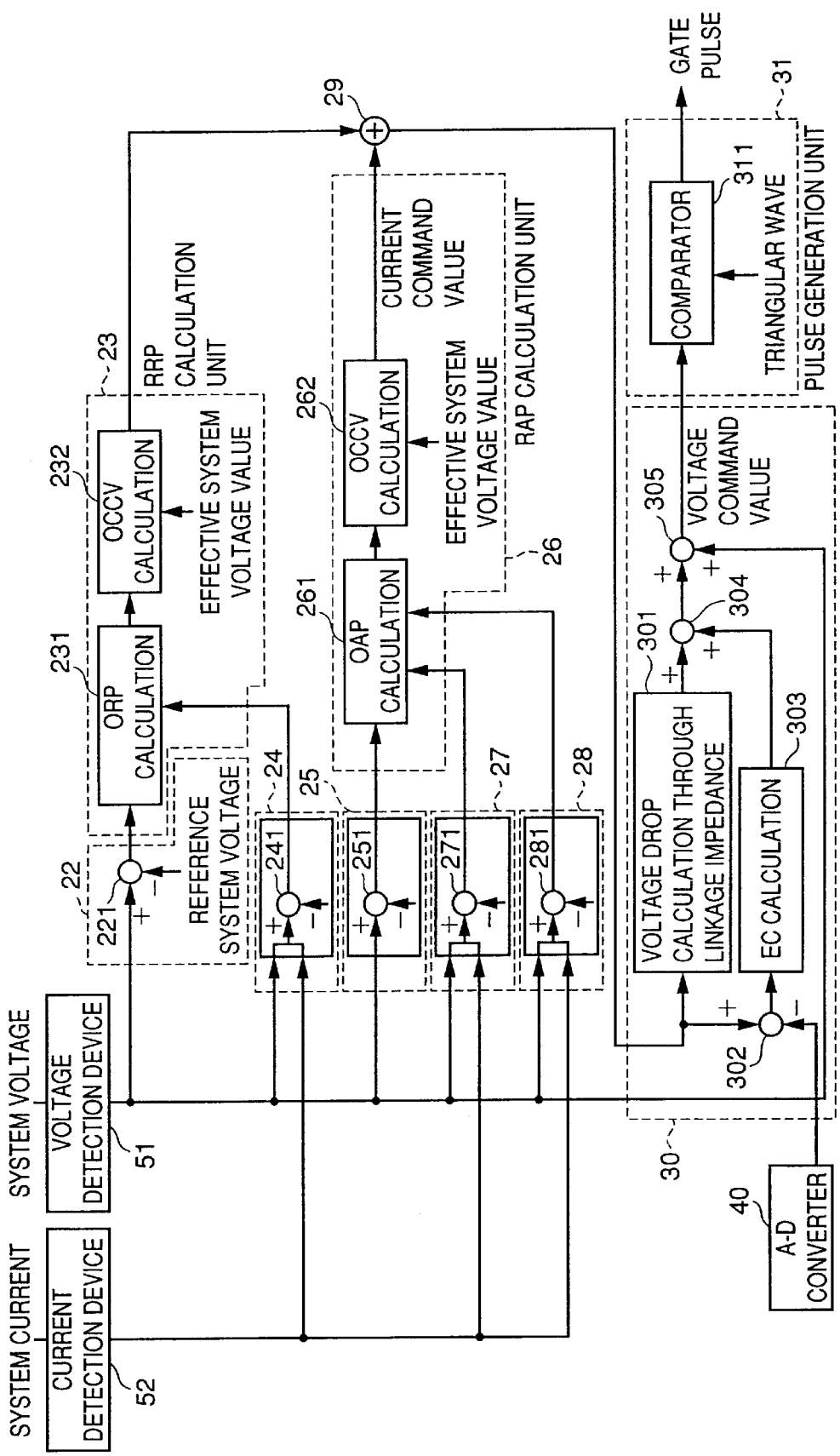
FIG. 3 is a block diagram more specifically showing an inverter control unit shown in FIG. 2.

Inverter control unit 21 will now be described in detail. FIG. 3 is a block diagram specifically showing inverter control unit 21. As shown in the figure, VD detection unit 22 includes a VD detector 221 comparing voltage detected by voltage detection device 51 with a reference system voltage previously held by VD detection unit 22.

RPD detection unit 24 includes a RPD detector 241 comparing an actual reactive power of a power system with a reference reactive power previously held by RPD detection unit 24.

RRP calculation unit 23 includes an output reactive power (ORP) computing unit 231 receiving a voltage deviation detected by VD detection unit 22 and a reactive power deviation signal output from RPD detection unit 24 and calculating an output reactive power value, and an output current command value (OCCV) computing unit 232 comparing a result obtained from ORP computing unit 231 with an effective system voltage value detected by voltage detection device 51, converting reactive power to a corresponding current value and computing an output current command value.

FD detection unit 25 includes a frequency deviation (FD) detector 251 comparing a component of a frequency detected by voltage detection device 51 with a reference system frequency previously stored in FD detection unit 25.

APD detection unit 27 includes an active power deviation (APD) detector 271 comparing with a reference system power value previously held by APD detection unit 27 an active power calculated from a system voltage detected by voltage detection device 51 and a system current detected by current detection device 52.

PA detection unit 28 includes a PA detector 281 comparing with an externally received reference active power an active power calculated from a system voltage detected by voltage detection device 51 and a system current detected by current detection device 52.

Herein a reference active power has a waveform of active power generation from each of the groups of power generators 201 to 205 and preferably it is received from a power generator which a power system corresponding thereto receives. Note that this reference active power may be active power on any power system.

RAP calculation unit 26 includes an output active power value (OAP) computing circuit 261 receiving a frequency deviation output from FD detection unit 25 and an active power deviation detected by APD detection unit 27 to compute an output active power value, and an output current command value (OCCV) computing circuit 262 receiving an output active power value from OAP computing circuit 261 and an effective system voltage value received from voltage detection device 51 to compute an output current command value.

OVCV unit 30 includes a voltage drop computing unit 301 depending on a linkage impedance receiving data obtained by adding together outputs of RRP calculation unit 23 and RAP calculation unit 26, a subtracter 302 subtracting from a value obtained by adding together the required reactive power and the required active power a current corresponding to the current conversion level output from A-D converter 40, an error correcting (EC) computing unit 303 receiving a result from subtracter 302 to correct a distortion of an output signal, an adder 304 receiving a result from voltage drop computing circuit 301 depending on linkage impedance and a result from EC computing circuit 303, and a voltage command value (VCV) production unit 305 adding together a result obtained from adder 304 and voltage detected by voltage detection device 51.

Pulse generation unit 31 includes a comparator 311 receiving an output of VCV production unit 305 and comparing it with a predetermined triangular wave to generate a gate pulse.

While in FIG. 2 voltage drop detection unit 22 and RPD detection unit 24 are used to calculate a required reactive power, only one of detection units 22 and 24 may alternatively be used, since a variation in voltage does not necessarily result in reactive power increasing accordingly.

Similarly, while FD detection unit 25 and APD detection unit 27 are provided to calculate a required active power, only one of detection units 25 and 27 may alternatively be used. When an active power fluctuates, a frequency normally fluctuates substantially proportionally and a required active power may thus be calculated via either detection unit 25 or detection unit 27, although employing both of them allows more accurate control.

This control is provided as will now be described more specifically.

With reference to FIG. 2, a power system stabilization system employing a rechargeable battery system with the present invention applied thereto can be used for example as a system 100a, 100b applied for a power generator having a significant fluctuation, system 100c applied to absorb large fluctuating load, and system 100d irrelevant to these systems, provided for system 3, different from main systems 1 and 2, to absorb frequency variation and voltage fluctuation.

If a rechargeable battery system is used for example in the form of rechargeable battery systems 100a, 100b and 100c, active power itself varies whereas frequency hardly fluctuates. As such, if a rechargeable battery system is used in the form of rechargeable battery system 100a and 100b, RPD detection unit 24 and APD detection unit 27 suffices in providing sufficient control, since active voltage and reactive voltage themselves significantly fluctuate.

For rechargeable battery system 100d, however, normally when main system power is sent from the group of power generators 200 to customer 311 significantly fluctuating in load the main system significantly fluctuates in active power and reactive power, whereas a system with rechargeable battery system 100d connected thereto and branching to the main system does not fluctuate in active power or reactive power as significantly as the main system. That is, in this system, active power and reactive power varies in a small amount although frequency and voltage varies. As such, it is difficult to detect a variation in active power and that in reactive power with RPD detection unit 24 and APD detection unit 27.

Herein, VD detection unit 22, FD detection unit 25, RRP calculation unit 23, and RAP calculation unit 26 can be used to calculate a required reactive power and a required active power. Note that the rechargeable battery may be that allowing for an overload input and output operation charging and discharging with a level of power larger than a rated value.

Conventionally, a rechargeable battery cannot have its ability fully used as its overload output and output duration are determined uniformly with a margin without duration characteristics of overload outputs taken into consideration.

Figure 4:
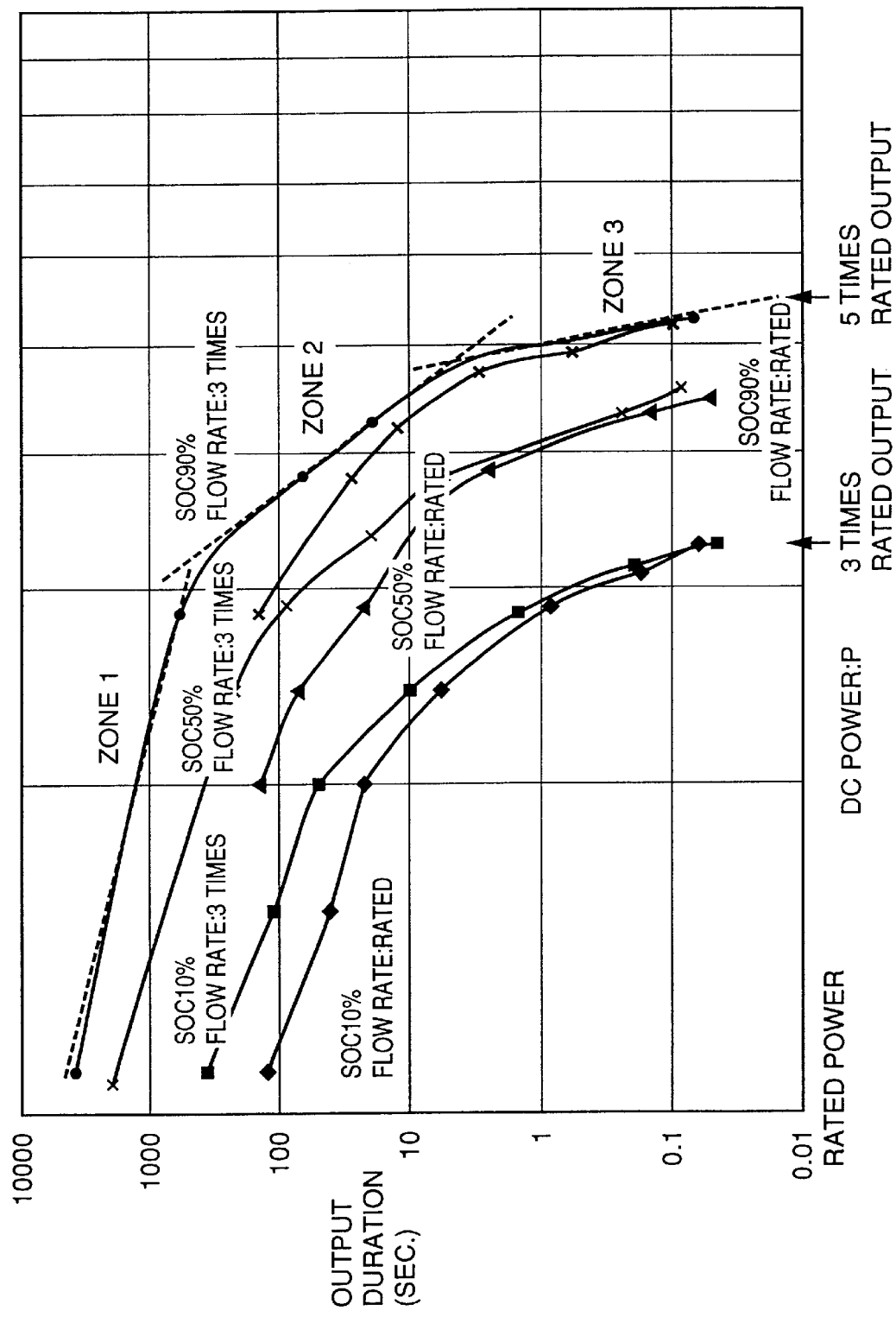
FIG. 4 shows the duration characteristics of overload outputs.

Thus in the present embodiment as shown in FIG. 4 the duration characteristics of overload outputs is represented in the form of zones in three areas which are considered for control to make the most use of the ability of the rechargeable battery of interest. With reference to FIG. 4, zones 1, 2 and 3 each represent a maximal time allowing an output to be continued while a fixed level of output voltage is maintained with a fixed level of active power output via inverter 20 activated by inverter control unit 21 in response to a value of a fixed active voltage output command issued to a rechargeable battery. As is apparent from FIG. 4, the duration characteristics of overload outputs is divided into three areas, indicating that an area with a large overload output has a short output duration. Zone 1 corresponds to the diffusion speed of vanadium ion nearby ion exchange films and electrode surfaces, zone 2 corresponds to the mobility and the diffusion speed of vanadium ion within the entire reaction cell, and zone 3 corresponds to the total capacity of vanadium electrolyte.

With this method, a mathematical expression can be used to clearly represent a period of time allowing a rechargeable battery to continuously overload input and output while maintaining a level of output voltage. More specifically, it can be understood from the FIG. 4 three zones 1, 2 and 3 that how long an output duration can be maintained for an overload output. As such, the FIG. 2 RAP calculation unit 26 can calculate active power with the three zones taken into consideration to allow the rechargeable battery's ability to be fully used and also to allow a high-precision model in modeling a simulation to allow a consideration closer to an actual condition.

Figure 5:
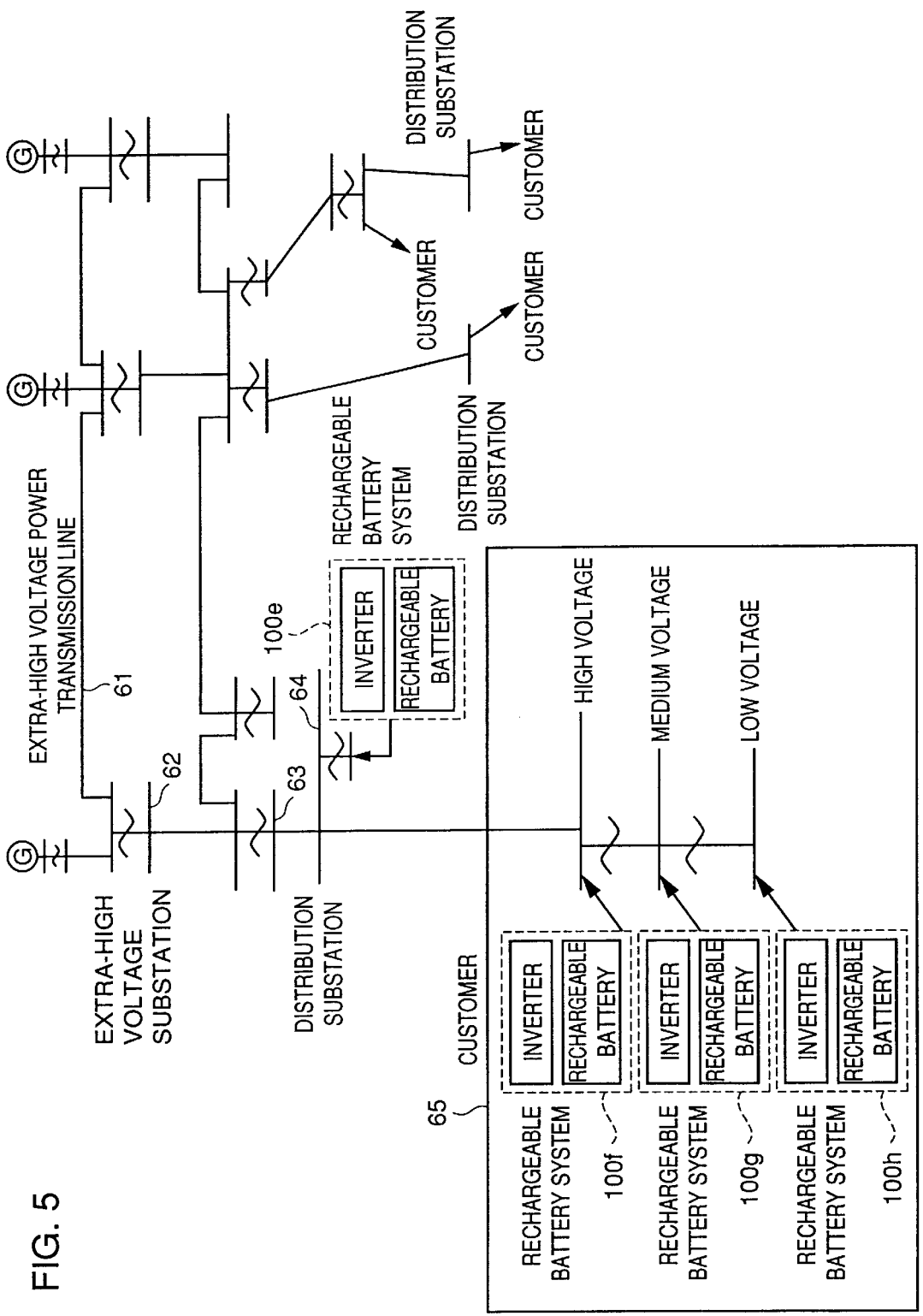
FIG. 5 shows a location at which a rechargeable battery is installed to reduce an instantaneous voltage drop.

FIG. 5 shows another embodiment of the present invention. In the present embodiment, a rechargeable battery system can be provided with appropriate capacity and also arranged at an appropriate location to effectively prevent an instantaneous voltage drop.

In FIG. 5, an extra high voltage power transmission line 61 is connected to an extra high voltage substation 62 and, further from substation 63, via a distribution substation 64 to supply power to a customer 65. In a vicinity of distribution substation 64 there is installed a rechargeable battery system 100e. Furthermore, customer 65 uses power of specially high voltage, high voltage and low voltage, as required, and for each voltage a power system can be provided with a corresponding one of rechargeable battery systems 100f, 100g and 100h.

FIG. 6 is a table of calculated capacities provided effective in preventing an instantaneous voltage drop when a rechargeable battery system installed in the FIG. 5 power system is simulated for different accident points, different locations at which the battery is installed and different capacities applied to the battery. As shown in FIG. 6, voltage drop is divided in width into a high level of 66 to 100%, an intermediate level of 33 to 66% and a low level of 0 to 33% and the rechargeable battery is located at a customer with low voltage, that with high voltage, that with extra high voltage or a distribution substation for determining the capacity to be applied. The FIG. 6 table can be referred to to determine a location at which the rechargeable battery is provided and a capacity applied to the battery, as required, to determine an optimal configuration to install a rechargeable battery system. More specifically, voltage drop is determined in width previously by a correlation between a plurality of areas and a power consumption of a customer and this correlation is referred to to determine a location at which the rechargeable battery system is installed. Thus the rechargeable battery system can be installed effectively and efficiently.

Furthermore, assuming that conventionally a rechargeable battery is fixed in efficiency, a specification of equipment is being reviewed. As a rechargeable battery's charging and discharging period becomes shorter, its efficiency tends to be enhanced. However, equipment specification has been reviewed with efficiency having a margin and the rechargeable battery's ability has not been made the most use of.

Figure 7:
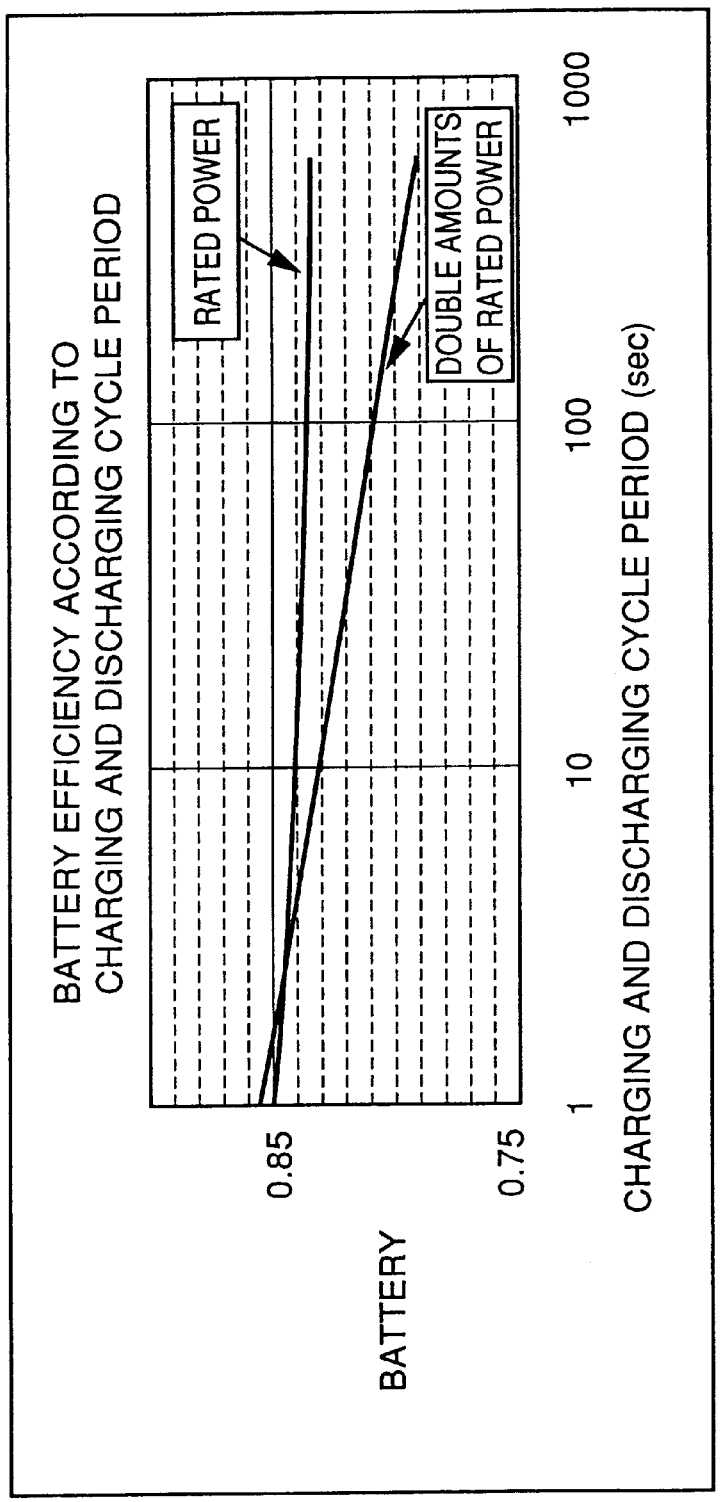
FIG. 7 shows the battery efficiencies according to the charging and discharging cycle period.

FIG. 7 shows the battery effieiencies according to the charging and discharging cycle period. It can be seen from FIG. 7 that if the rechargeable battery is repeatedly used with a short period its charging and discharging efficiency varies as its charging and discharging period varies. As such the fact that the rechargeable battery's efficiency varies with its charging and discharging period is considered in determining a specification of equipment. More specifically, if charging and discharging efficiency varies with fluctuation period, as shown in FIG. 7, using the battery so that fluctuation occurs in a short period can enhance efficiency to ensure the same ability with small-capacity equipment. This efficiency variation attributed to fluctuation period is used in determining a specification of equipment.

In an experiment, as shown in FIG. 7, charging and discharging efficiency is measured with the rechargeable battery having output fluctuation different in width and period. Since efficiency varies with fluctuation period, equipment can have its specification determined to correspond to a level of efficiency depending on how the rechargeable battery is used.

Furthermore, there is also proposed a technique using various basic performances of a recharbeable battery as parameters to automatically calculate an optimal capacity to be applied and a control logic depending on the location at which the battery is installed and the purpose thereof.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A power system stabilization system for stabilizing a power system transmitting power from first equipment that generates power to second equipment that consumes power, said power system stabilization system comprising:

a rechargeable power supply system including a rechargeable battery and converting direct-current power of said rechargeable battery into alternating-current power and supplying the alternating-current power to said power system;

a detection circuit for detecting a difference between a previously set value of active power, a previously set value of reactive power, and a preset reference frequency of said power system, and a present value thereof; and a control circuit, responsive to a result obtained in said detection circuit, for controlling at least one of active power and reactive power output from said rechargeable power supply system.

2. The power system stabilization system of claim 1, wherein said detection circuit includes:

voltage detection circuit for detecting a voltage of said power system;

current detection circuit for detecting a current of said power system;

voltage deviation detection circuit for detecting a deviation of a voltage in effect held by said power system from a predetermined voltage to be held by said power system; and reactive power deviation detection circuit referring the deviation voltage detected by said voltage deviation detection circuit and the current detected by said current detection circuit, for detecting a deviation of the present value of reactive power from the previously set value of reactive power.

3. The power system stabilization system of claim 2, wherein said control circuit includes:

circuit for calculating a required reactive power from at least one of the deviation voltage detected by said voltage deviation detection circuit and the deviation in reactive power detected by said reactive power deviation detection circuit; and reactive power control circuit referring to the required reactive power calculated by said circuit for calculating a required reactive power, for controlling a reactive power output from said rechargeable power supply system.

4. The power system stabilization system of claim 3, wherein:

said detection circuit includes instantaneous-voltage drop detection circuit for detecting a drop in instantaneous voltage from the voltage detected by said voltage detection circuit; and said circuit for calculating a required reactive power calculates the required reactive power from the drop in instantaneous voltage detected by said instantaneous-voltage drop detection circuit.

5. The power system stabilization system of claim 2, comprising;

voltage detection circuit for detecting a voltage of said power system;

current detection circuit for detecting a current of said power system; and active power deviation detection circuit referring to the voltage detected by said voltage detection circuit and the current detected by said current detection circuit, for detecting a deviation of the present value of active power from the previously set value of active power.

6. The power system stabilization system of claim 5, wherein:

said detection circuit includes a frequency deviation detection circuit for detecting a deviation of a frequency in effect held by said power system from a predetermined frequency to be held by said power system; and said control circuit includes circuit for calculating a required active power from at least one of the deviation in frequency detected by said frequency deviation detection circuit and the deviation in active power detected by said active power deviation detection circuit, and active power control circuit referring to the required active power calculated by said circuit for calculating a required active power, for controlling an active power output from said rechargeable power supply system.

7. The power system stabilization system of claim 6, wherein:

said detection circuit further includes phase angle detection circuit for detecting a phase angle obtained at a connection point; and said circuit for calculating a required active power calculates the required active power from at least one of the deviation in frequency detected by said frequency deviation detection circuit, the deviation in active power detected by said active power deviation detection circuit, and the phase angle detected by said phase angle detection circuit at the connection point.

8. The power system stabilization system of claim 1, wherein:

said rechargeable power supply system includes A-D conversion circuit for receiving the alternating-current power from said power system, converting the received alternating-current power into direct-current power and charging said buttery with the direct-current power, and for converting the direct-current power of said battery into alternating-current power to supply the alternating-current power to said power system; and said control circuit controls said A-D conversion circuit to charge and discharge said battery in response to a fact that a detection result output is received from said detection circuit.

9. The power system stabilization system of claim 8, wherein said control circuit refers to said rechargeable battery's efficiency characteristic according to a charging and discharging cycle period to control at least one of active power and reactive power output from said rechargeable power supply system.

10. The power system stabilization system of claim 1, wherein said rechargeable power supply system includes a battery allowing for an overload input and output with a level of power larger than a rated value.

11. The power system stabilization system of claim 1, said second equipment being electric railways equipment, wherein said rechargeable power supply system absorbs regenerative energy attributed to regenerative-breaking of a vehicle of said electric railways equipment.

12. A method of stabilizing a power system via a rechargeable power supply system provided between power generation equipment and power consumer equipment, comprising the steps of:

detecting a frequency, active power, and reactive power of said power system;

determining deviations of the frequency, the reactive power and the active power from a preset reference frequency, a preset reference active power and a preset reference reactive power; and responding to a result of the determining step, controlling at least one of an active power and a reactive power output from said rechargeable power system to supply said power consumer equipment with a predetermined power.

* * * * *